106. COMPOSITIONS, COATING OR PLASTIC.

84

UNITED STATES PATENT OFFICE.

ERNST BUSHMAN, OF NEW YORK, N. Y., ASSIGNOR OF ONE-FOURTH TO WILLIAM BUCKNOR, OF SAME PLACE.

COMPOSITION OF MATTER.

SPECIFICATION forming part of Letters Patent No. 656,167, dated August 21, 1900.

Application filed November 10, 1899. Serial No. 736,522. (No specimens.)

*To all whom it may concern:*

Be it known that I, ERNST BUSHMAN, a citizen of the United States, and a resident of New York, (No. 21 Prospect street, Stapleton,) county of Richmond, and State of New York, have invented a certain new and useful Composition of Matter, of which the following is a specification.

My composition consists of the following ingredients combined in the proportions stated, viz: silicate of soda, eighteen parts; caustic potash, ten parts; aluminium, one-half part; water, enough to dissolve caustic potash. The above composition when thoroughly mingled is to be used with a filler composed of pulverized flint and metal oxid, water being used for dissolving the compound to the consistency of a thick paste. These ingredients are thoroughly mingled and boiled for three hours and the precipitate dissolved in water to the consistency of a thick paste. This composition when dried affords a cheap and effective covering for walls, ceilings, iron or wood, and its hardness admits of its being used as an artificial-stone sidewalk or for flooring purposes.

The composition is applied while in its pasty condition as ordinary mortar to the laths or iron that is to be covered and allowed to dry.

The proportions mentioned herein are by weight.

What I claim, and desire to secure by Letters Patent, is—

The above-described composition of matter consisting of silicate of soda, caustic potash, aluminium and water in the proportions specified, substantially as described and for the purpose specified.

In testimony that I claim the foregoing as my invention I have signed my name, in presence of two witnesses, this 8th day of November, 1899.

ERNST BUSHMAN.

Witnesses:
 BELLE McCOMB,
 ROBERT A. WILLIAMS.

No references.